US012263490B2

(12) United States Patent
Höglund

(10) Patent No.: US 12,263,490 B2
(45) Date of Patent: Apr. 1, 2025

(54) CENTRIFUGAL SEPARATOR HAVING ECCENTRIC CONDUIT

(71) Applicant: ALFA LAVAL CORPORATE AB, Lund (SE)

(72) Inventor: Kasper Höglund, Rönninge (SE)

(73) Assignee: ALFA LAVAL CORPORATE AB, Lund (SE)

(*) Notice: Subject to any disclaimer, the term of this patent is extended or adjusted under 35 U.S.C. 154(b) by 909 days.

(21) Appl. No.: 17/296,604

(22) PCT Filed: Dec. 9, 2019

(86) PCT No.: PCT/EP2019/084149

§ 371 (c)(1),
(2) Date: May 25, 2021

(87) PCT Pub. No.: WO2020/120365

PCT Pub. Date: Jun. 18, 2020

(65) Prior Publication Data

US 2022/0023887 A1 Jan. 27, 2022

(30) Foreign Application Priority Data

Dec. 10, 2018 (EP) .................................... 18211240
Dec. 10, 2018 (EP) .................................... 18211241
May 29, 2019 (EP) .................................... 19177320

(51) Int. Cl.
*B04B 1/08* (2006.01)
*B04B 7/08* (2006.01)
(Continued)

(52) U.S. Cl.
CPC .................. *B04B 1/08* (2013.01); *B04B 7/08* (2013.01); *B04B 7/14* (2013.01); *B04B 9/12* (2013.01); *B04B 11/02* (2013.01)

(58) Field of Classification Search
CPC .... B04B 1/08; B04B 7/08; B04B 7/14; B04B 9/12; B04B 11/02
See application file for complete search history.

(56) References Cited

U.S. PATENT DOCUMENTS 2,104,683 A 1/1938 Rosen et al.
2,731,331 A * 1/1956 Strezynski ................ B04B 7/14 494/71

(Continued)

FOREIGN PATENT DOCUMENTS

CN 1758983 A 4/2006
CN 101506552 A 8/2009

(Continued)

OTHER PUBLICATIONS

International Search Report, issued in PCT/EP2019/084149, PCT/ISA/210, dated Jan. 14, 2020.

(Continued)

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

An exchangeable separation insert for a centrifugal separator includes a feed inlet, a light phase outlet and a heavy phase outlet. Two of the feed inlet, light phase outlet and heavy phase outlet are arranged at a first axial end of the rotor casing. A first seal assembly seals and connects the two inlet/outlets to a corresponding inlet conduit and/or outlet conduits in the first stationary portion. The first seal assembly includes a rotatable part and a stationary part. The rotatable and stationary part are axially aligned and seal against each other. A first of the two inlet/outlets is arranged axially at the axis of rotation and a second of the two inlet/outlets is arranged axially outside of the first of the two inlet/outlets in such a manner that both the first and second (Continued)

of the two inlet/outlets are led through the rotatable part and the corresponding inlet conduit and/or outlet conduits are led through the stationary part of the first seal assembly.

19 Claims, 4 Drawing Sheets

(51) Int. Cl.
*B04B 7/14* (2006.01)
*B04B 9/12* (2006.01)
*B04B 11/02* (2006.01)

(56) References Cited

U.S. PATENT DOCUMENTS

| | | | |
|---|---|---|---|
| 3,602,425 | A | 8/1971 | Schmidt |
| 3,759,591 | A | 9/1973 | Wright et al. |
| 4,759,744 | A | 7/1988 | Krook |
| 6,439,577 | B2 | 8/2002 | Jorgensen et al. |
| 6,709,377 | B1 | 3/2004 | Rochat |
| 7,037,428 | B1 | 5/2006 | Robinson et al. |
| 2009/0280974 | A1 | 11/2009 | Klintentedt |
| 2011/0319248 | A1 | 12/2011 | Starbard |
| 2016/0184836 | A1 | 6/2016 | Mackel et al. |
| 2017/0189915 | A1 | 7/2017 | Mackel et al. |
| 2017/0203306 | A1* | 7/2017 | Penkl ...................... B04B 11/02 |
| 2018/0147581 | A1 | 5/2018 | Quiter et al. |

FOREIGN PATENT DOCUMENTS

| | | | | |
|---|---|---|---|---|
| CN | 108898051 | A | 10/2018 | |
| DE | 102009053660 | B3 | 5/2011 | |
| EP | 0037210 | A1 | 10/1981 | |
| EP | 0241128 | A1 * | 10/1987 | ............. B04B 11/02 |
| EP | 0809536 | B1 * | 6/2001 | ............... B04B 1/08 |
| EP | 2567754 | A1 * | 3/2013 | ............... B04B 1/00 |
| EP | 3384993 | A1 * | 10/2018 | ............... B04B 1/08 |
| WO | WO 2004/082843 | A1 | 9/2004 | |
| WO | WO 2008/013495 | A1 | 1/2008 | |
| WO | WO 2008/106409 | A1 | 9/2008 | |
| WO | WO 2013/034495 | A2 | 3/2013 | |
| WO | WO 2014/000829 | A1 | 1/2014 | |
| WO | WO 2015/181175 | A2 | 12/2015 | |
| WO | WO 2015/181177 | A1 | 12/2015 | |
| WO | WO 2016/089022 | A1 | 6/2016 | |
| WO | WO 2016/192927 | A1 | 12/2016 | |
| WO | WO 2017/144339 | A1 | 8/2017 | |

OTHER PUBLICATIONS

Written Opinion of the International Searching Authority, issued in PCT/EP2019/084149, PCT/ISA/237, dated Jan. 14, 2020.
English translation of Korean Office Action for Korean Application No. 10-2021-7021250, dated Jan. 16, 2023.
English translation of the Chinese Office Action and Search Report for corresponding Chinese Application No. 201980081602.5, dated Jun. 21, 2022.

* cited by examiner

CENTRIFUGAL SEPARATOR HAVING ECCENTRIC CONDUIT

TECHNICAL FIELD

The present inventive concept relates to the field of centrifugal separators. More particularly it relates to an exchangeable separation insert for a centrifugal separator for separating a fluid mixture, and a centrifugal separator comprising such an exchangeable separation insert.

BACKGROUND

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

When processing pharmaceutical products such as fermentation broths, it may be desirable to eliminate the need for cleaning-in-place processes of the rotating bowl and the separator parts that have contacted the processed product. More useful may be to exchange the rotating bowl as a whole, i.e. to use a single use solution. This is advantageous from a hygienic perspective of the process.

WO 2015/181177 discloses a separator for the centrifugal processing of a flowable product comprising a rotatable outer drum and an exchangeable inner drum arranged in the outer drum. The inner drum comprises means for clarifying the flowable product. The outer drum is driven via drive spindle by a motor arranged below the outer drum. The inner drum extends vertically upwardly through the outer drum which has fluid connections arranged at an upper end of the separator.

However, there is a need in the art for single use solutions for centrifugal separation that are compact and easy to handle for an operator.

SUMMARY

It is an object of the invention to at least partly overcome one or more limitations of the prior art. In particular it is an object to provide an exchangeable separation insert that is compact and allows for increased manoeuvrability and handling for the operator.

Thus, an exchangeable separation insert for a centrifugal separator comprises a rotor casing enclosing a separation space in which a stack of separation discs is arranged to rotate around an axis of rotation. Said rotor casing is axially arranged between a first and a second stationary portion. The insert comprises further a feed inlet for supply of the fluid mixture to be separated to said separation space, a light phase outlet for discharge of a separated phase of a first density, and a heavy phase outlet for discharge of a separated phase of a second density higher than said first density.

Two of said feed inlet, light phase outlet and heavy phase outlet are arranged at a first axial end of said rotor casing. A first seal assembly is sealing and connecting said two of said feed inlet, light phase outlet and heavy phase outlet to corresponding inlet conduit and/or outlet conduits in said first stationary portion.

Said first seal assembly comprises a rotatable part attached to said rotor casing and a stationary part attached to said stationary portion.

Said rotatable part and said stationary part are axially aligned and seal against each other.

A first of said two of said feed inlet, light phase outlet and heavy phase outlet is arranged axially at the axis of rotation and a second of said two of said feed inlet, light phase outlet and heavy phase outlet is arranged axially outside of said first of said two of said feed inlet, light phase outlet and heavy phase outlet in such a manner that both said first and second of said two of said feed inlet, light phase outlet and heavy phase outlet are led through said rotatable part and said corresponding inlet conduit and/or outlet conduits are led through said stationary part of said first seal assembly.

Said light phase outlet may be arranged at said first axial end.

Said feed inlet may be arranged at said first axial end.

Said stationary heavy phase outlet may be arranged at said first axial end.

Said rotatable part may be a plate-formed seal element with a centre-hole for said feed inlet and at least one outlet-hole for one of the light phase or heavy phase outlets.

Said stationary part may comprise two concentrically arranged ring-formed seal elements.

The inner of said ring-formed seal elements may be arranged to engage with the rotatable part axially outside said centre-hole and axially inside said at least one outlet-hole.

At least one fluid connection may be formed within at least the inner of said two ring-formed seal elements.

At least the inner of said two ring-formed seal elements has a recess in its surface facing said rotatable part of said seal assembly, which recess is connected to said at least one fluid connection.

The at least one fluid connection may comprise a seal fluid inlet for supplying fluid to the at least one of said recesses.

The at least one fluid connection may also comprise a seal fluid outlet for removing fluid from the at least one of said recesses.

Said seal fluid inlet and said seal fluid outlet may both be attached to a container forming a closed circulation system.

A pump may be arranged in said seal fluid inlet to supply liquid to said first seal assembly.

Said container may be pre-pressurized to supply liquid to said first seal assembly.

The exchangeable separation insert is configured to be inserted and secured within a rotatable member journaled in a stationary frame, both comprised by the centrifugal separator.

According to another aspect of the invention a centrifugal separator comprises a stationary frame and a rotatable member journaled in said stationary frame, comprising an exchangeable separation insert, which exchangeable separation insert is arranged in such manner that said rotor casing is fitted in said rotatable member, and said first and second stationary portions are fitted in said stationary frame.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
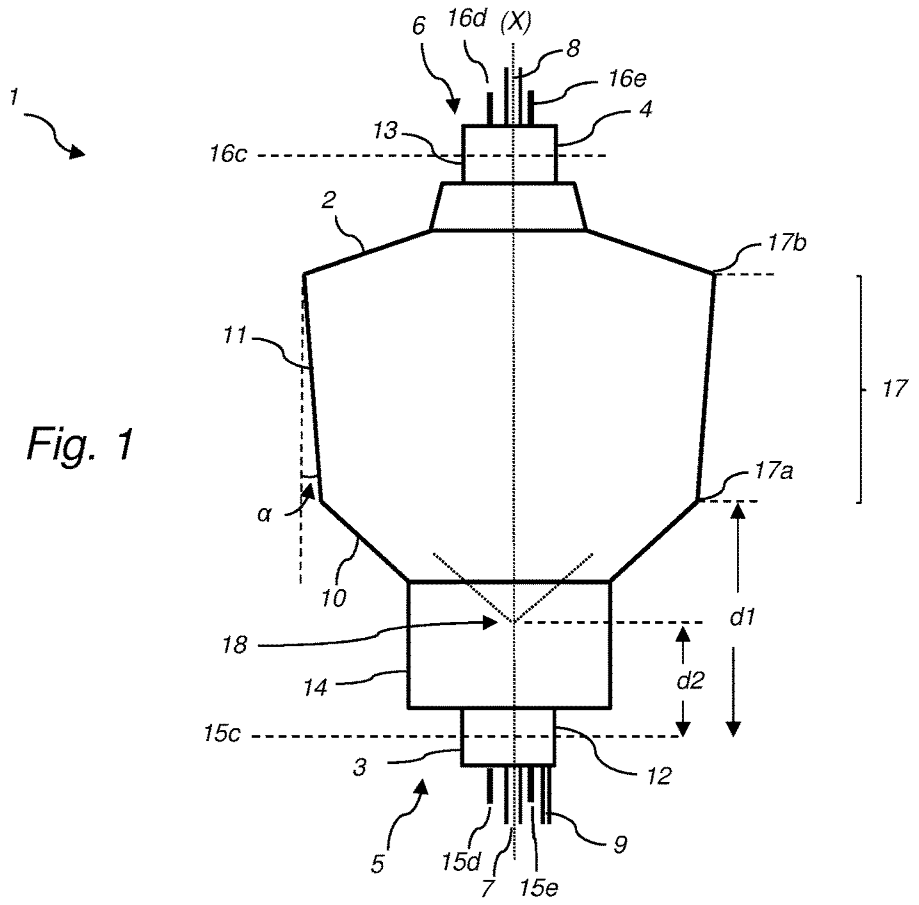
FIG. 1 is a schematic outer side view of a separator bowl in the form of an exchangeable separation insert according to the present disclosure.

FIG. 1 shows an outer side view of a centrifugal separator bowl 1*a* of the present disclosure in the form of an exchangeable separation insert 1. The insert 1 comprises a rotor casing 2 arranged between a first stationary portion 3 and a second stationary portion 4, as seen in the axial direction defined by rotational axis (X). The first stationary portion 3 is at the first axial end 5 of the insert 1, whereas the second stationary portion 4 is arranged at the second axial end 6 of the insert 1. In the embodiment disclosed in FIG. 1, the first stationary portion 3 and the first end axial end 5 are situated at the lower part of the exchangeable separation insert 1, while the second stationary portion 4 and the second axial end 6 are situated at the upper part the exchangeable separation insert 1.

The feed inlet is in this example arranged at the first axial lower end 5, and the feed is supplied via a stationary inlet conduit 7 arranged in the first stationary portion 3. The stationary inlet conduit 7 is arranged at the rotational axis (X). The first stationary portion 3 further comprises a stationary outlet conduit 9 for the separated liquid phase of lower density, also called the separated liquid light phase.

There is further a stationary outlet conduit 8 arranged in the upper stationary portion 4 for discharge of the separated phase of higher density, also called the liquid heavy phase. Thus, in this embodiment, the feed is supplied via the lower axial end 5, the separated light phase is discharged via the lower axial end 5, whereas the separated heavy phase is discharged via the upper axial end 6.

The outer surface of the rotor casing 2 comprises a first 10 and second 11 frustoconical portion. The first frustoconical portion 10 is arranged axially below the second frustoconical portion 11. The outer surface is arranged such that the imaginary apex of the first 10 and second 11 frustoconical portions both point in the same axial direction along the rotational axis (X), which in this case is axially down towards the lower axial end 5 of the insert 1.

Furthermore, the first frustoconical portion 10 has an opening angle that is larger than the opening angle of the second frustoconical portion 11. The opening angle of the first frustoconical portion 10 may be substantially the same as the opening angle of a stack of separation discs contained within the separation space 17 of the rotor casing 2. The opening angle of the second frustoconical portion 11 may be smaller than the opening angle of a stack of separation discs contained within the separation space of the rotor casing 2. As an example, the opening angle of the second frustoconical portion 11 may be such that the outer surface forms an angle α with rotational axis that is less than 10 degrees, such as less than 5 degrees. The rotor casing 2 having the two frustoconical portions 10 and 11 with imaginary apexes pointing downwards allows for the insert 1 to be inserted into a rotatable member 31 from above. Thus, the shape of the outer surface increases the compatibility with an external rotatable member 31, which may engage the whole, or part of the outer surface of the rotor casing 2, such as engage the first 10 and second 11 frustoconical portions.

There is a lower rotatable seal arranged within lower seal housing 12 which separates the rotor casing 2 from the first stationary portion 3 and an upper rotatable seal arranged within upper seal housing 13 which separates the rotor casing 2 from the second stationary portion 4. The axial position of the sealing interface within the lower seal housing 12 is denoted 15*c*, and the axial position of the sealing interface within the upper seal housing 13 is denoted 16*c*. Thus, the sealing interfaces formed between such stationary part 15*a*, 16*a* and rotatable part 15*b*, 16*b* of the first 15 and second 16 rotatable seals also form the interfaces or border between the rotor casing 2 and the first 15 and second 16 stationary portions of the insert 1.

There are further a seal fluid inlet 15*d* and a seal fluid outlet 15*e* for supplying and withdrawing a seal fluid, such as a cooling liquid, to the first rotatable seal 15 and in analogy, a seal fluid inlet 16*d* and a seal fluid outlet 16*e* for supplying and withdrawing a seal fluid, such as a cooling liquid, to the second rotatable seal 16.

Shown in FIG. 1 is also the axial positions of the separation space 17 enclosed within the rotor casing 2. In this embodiment, the separation space 17 is substantially positioned within the second frustoconical portion 11 of the rotor casing 2. The heavy phase collection space 17*c* of the separation space 17 extends from a first, lower, axial position 17*a* to a second, upper, axial position 17*b*. The inner peripheral surface of the separation space 17 may form an angle with the rotational axis (X) that is substantially the same as angle α, i.e. the angle between the outer surface of the second frustoconical portion 11 and the rotational axis (X). The inner diameter of the separation space 17 may thus increase continuously from the first axial position 17*a* to the second axial position 17*b*. Angle α may be less than 10 degrees, such as less than 5 degrees.

The exchangeable separation insert 1 has a compact form that increases the manoeuvrability and handling of the insert 1 by an operator. As an example, the axial distance between the separation space 17 and the first stationary portion 3 at the lower axial end 5 of the insert may be less than 20 cm, such as less than 15 cm. This distance is denoted d1 in FIG. 1, and is in this embodiment the distance from the lowest axial position 17*a* of the heavy phase collection space 17*c* of the separation space 17 to the sealing interface 15*c* of the first rotatable seal 15. As a further example, if the separation space 17 comprises a stack of frustoconical separation discs, the frustoconical separation disc that is axially lowest in the stack and closest to the first stationary portion 3, may be arranged with the imaginary apex 18 positioned at an axial distance d2 from the first stationary portion 3 that is less than 10 cm, such as less than 5 cm. Distance d2 is in this embodiment the distance from the imaginary apex 18 of the axially lowermost separation disc to the sealing interface 15*c* of the first rotatable seal 15.

Figure 2:
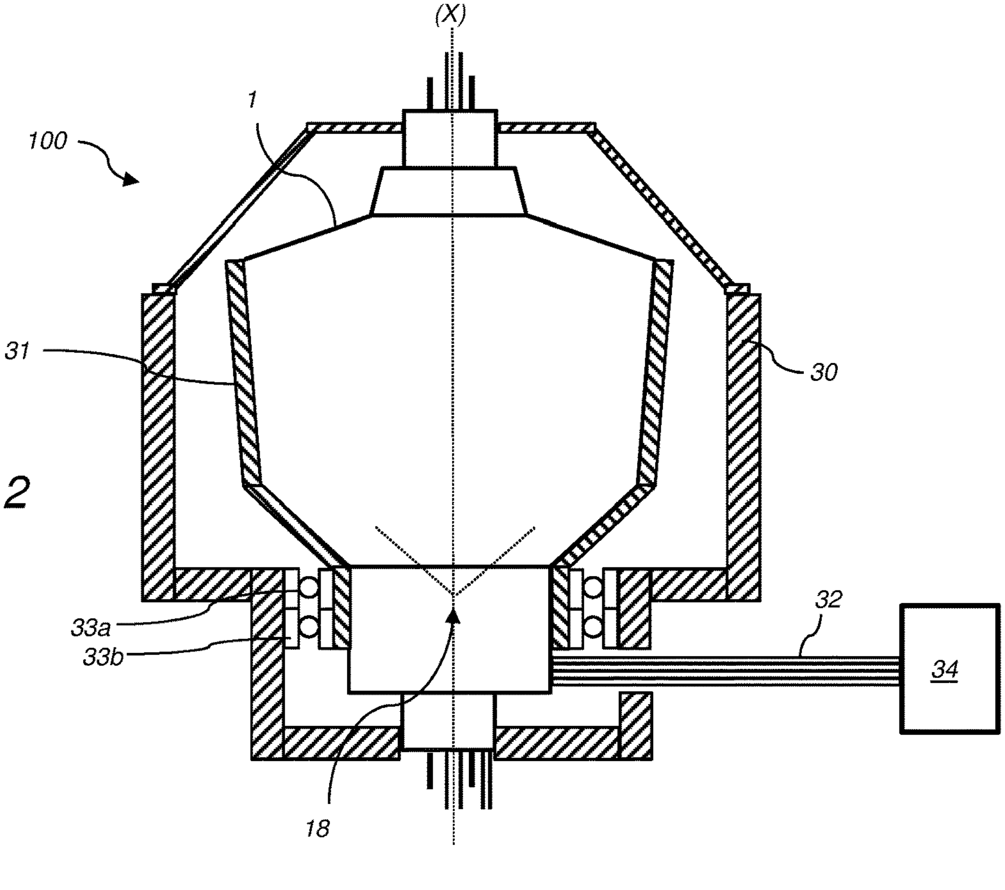
FIG. 2 is a schematic section of a centrifugal separator comprising an exchangeable insert according to the present disclosure.

FIG. 2 shows a schematic drawing of the exchangeable separation insert 1 being inserted within centrifugal separator 100, which comprises a stationary frame 30 and a rotatable member 31 that is supported by the frame by means of supporting means in the form of an upper and lower ball bearing 33*a*, 33*b*. There is also a drive unit 34, which in this case is arranged for rotating the rotatable member 31 around the axis of rotation (X) via drive belt 32. However, other driving means are possible, such as an electrical direct drive.

The exchangeable separation insert 1 is inserted and secured within rotatable member 31. The rotatable member 31 thus comprises an inner surface for engaging with the outer surface of the rotor casing 2. The upper and lower ball bearings 33*a*, 33*b* are both positioned axially below the separation space 17 within the rotor casing 2 such that the cylindrical portion 14 of the outer surface of the rotor casing 2 is positioned axially at the bearing planes. The cylindrical portion 14 thus facilitates mounting of the insert within at least one large ball bearing. The upper and lower ball bearings 33*a*, 33*b* may have an inner diameter of at least 80 mm, such as at least 120 mm.

Further, as seen in FIG. 2, the insert 1 is positioned within rotatable member 31 such that the imaginary apex 18 of the lowermost separation disc is positioned axially at or below at least one bearing plane of the upper and lower ball bearings 33*a*, 33*b*.

Moreover, the separation insert is mounted within the separator 1 such that the axial lower end 5 of the insert 1 is positioned axially below the supporting means, i.e. the upper and lower bearings 33*a*, 33*b*. The rotor casing 2 is in this example arranged to be solely externally supported by the rotatable member 31. The separation insert 1 is further mounted within the separator 100 to allow easy access to the inlet and outlets at the top and bottom of the insert 1.

Figure 3:
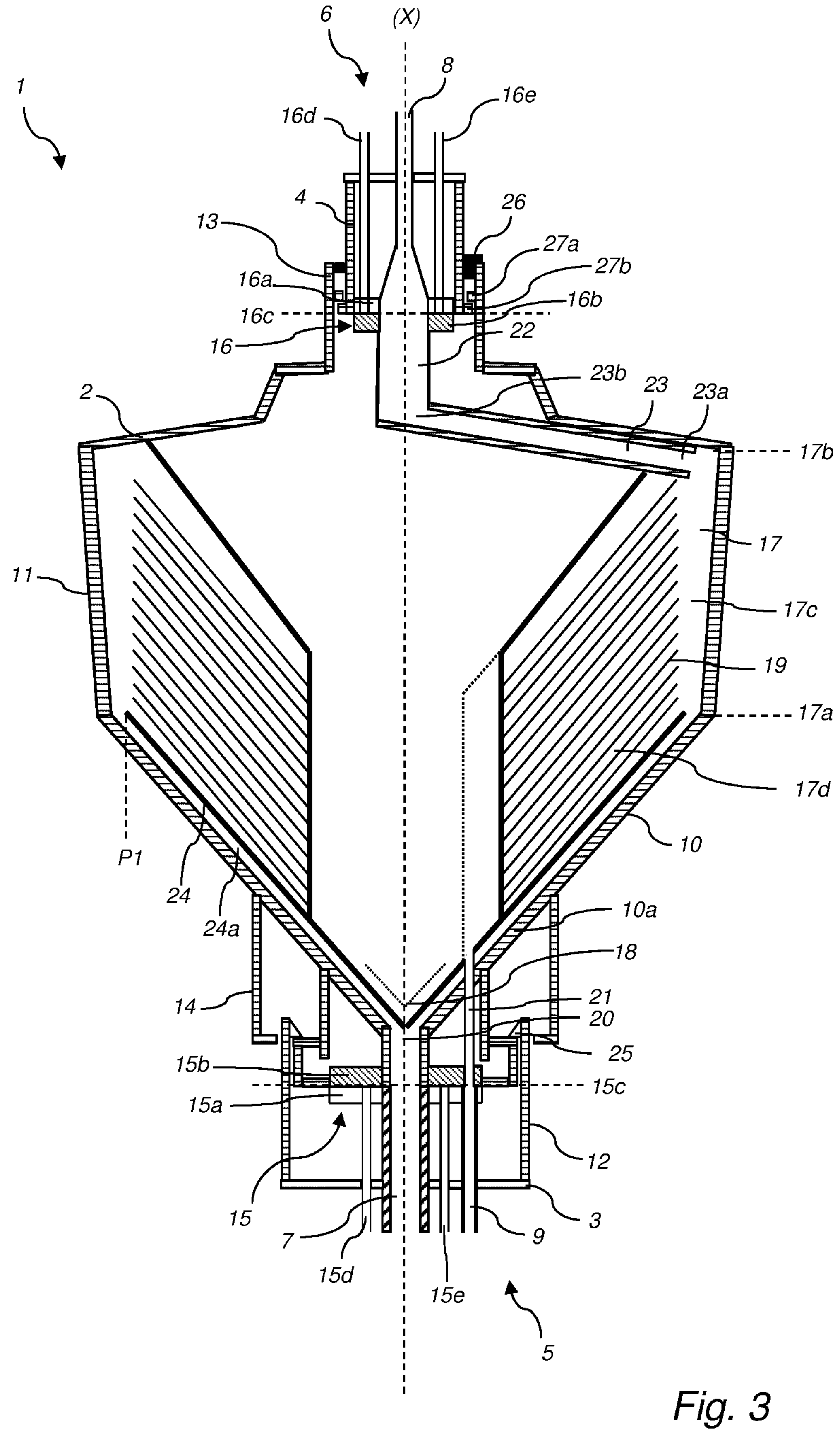
FIG. 3 is a schematic section view of an exchangeable separation insert according to the present disclosure.

FIG. 3 shows a schematic illustration of cross-section of an embodiment of exchangeable separation insert 1 of the present disclosure. The insert 1 comprises a rotor casing 2 arranged to rotate around rotational axis (X) and arranged between a first, lower stationary portion 3 and a second, upper stationary portion 4. The first stationary portion 3 is thus arranged at the lower axial end 5 of the insert 1, whereas the second stationary portion 4 is arranged at the upper axial end 6 of the insert 1.

The feed inlet 20 is in this example arranged at the axial lower end 5, and the feed is supplied via a corresponding stationary inlet conduit 7 arranged in the first stationary portion 3. The stationary inlet conduit 7 may comprise a tubing, such as a plastic tubing.

The stationary inlet conduit 7 is arranged at the rotational axis (X) so that the material to be separated is supplied at the rotational centre. The feed inlet 20 is for receiving the fluid mixture to be separated.

The feed inlet 20 is in this embodiment arranged at the apex of an inlet cone 10*a*, which on the outside of the insert 1 also forms the first frustoconical outer surface 10. There is further a distributor 24 arranged in the feed inlet for distributing the fluid mixture from the inlet 20 to the separation space 17.

The separation space 17 comprises an outer heavy phase collection space 17*c* that extends axially from a first, lower axial position 17*a* to a second, upper axial position 17*b*. The separation space 17 further comprises a radially inner space formed by the interspaces between the separation discs of the stack 19.

The distributor 24 has in this embodiment a conical outer surface with the apex at the rotational axis (X) and pointing toward the lower end 5 of the insert 1. The outer surface of the distributor 24 has the same conical angle as the inlet cone 10*a*. There is further a plurality of distributing channels 24*a* extending along the outer surface for guiding the fluid mixture to be separated continuously axially upwards from an axially lower position at the inlet 20 to a radially upper position in the separation space 17. This axially upper position is substantially the same as the first, lower axial position 17*a* of the heavy phase collection space 17*c* of the separation space 17. The distribution channels 24*a* may for example have a straight shape or a curved shape, and thus extend between the outer surface of the distributor 24 and the inlet cone 10*a*. The distribution channels 24*a* may be diverging from an axial lower position to an axial upper position. Furthermore, the distribution channels 24*a* may be in the form of tubes extending from an axial lower position to an axial upper position.

There is further a stack 19 of frustoconical separation discs arranged coaxially in the separation space 17. The separation discs in the stack 19 are arranged with the imaginary apex pointing to the axially lower end 5 of the separation insert 1, i.e. towards the inlet 20. The imaginary apex 18 of the lowermost separation disc in the stack 19 may be arranged at a distance that is less than 10 cm from the first stationary portion 3 in the axial lower end 5 of the insert 1. The stack 19 may comprise at least 20 separation discs, such as at least 40 separation discs, such as at least 50 separation discs, such as at least 100 separation discs, such as at least 150 separation discs. For clarity reasons, only a few discs are shown in FIG. 1. In this example, the stack 19 of separation discs is arranged on top of the distributor 24, and the conical outer surface of the distributor 24 may thus have the same angle relative the rotational axis (X) as the conical portion of the frustoconical separation discs. The conical shape of the distributor 24 has a diameter that is about the same or larger than the outer diameter of the separation discs in the stack 19. Thus, the distribution channels 24*a* may thus be arranged to guide the fluid mixture to be separated to an axially outer position 17*a* in the separation space 17 that is at a radial position P1 that is outside the radial position of the outer circumference of the frustoconical separation discs in the stack 19.

The heavy phase collection space 17*c* of the separation space 17 has in this embodiment an inner diameter that continuously increases from the first, lower axial position 17*a* to the second, upper axial position 17*b*. There is further an outlet conduit 23 for transporting a separated heavy phase from the separation space 17. This conduit 23 extends from a radially outer position of the separation space 17 to the heavy phase outlet 22. In this example, the conduit 23 is in the form of a single pipe extending from a central position radially out into the separation space 17. However, there may be at least two such outlet conduits 23, such as at least three, such as at least five, outlet conduits 23. The outlet conduit 23 has thus a conduit inlet 23*a* arranged at a radially outer position and a conduit outlet 23*b* at a radially inner position, and the outlet conduit 23 is arranged with an upward tilt from the conduit inlet 23*a* to the conduit outlet 23*b*. As an example, the outlet conduit 23 may be tilted with an upward tilt of at least 2 degrees, such as at least five degrees, such as at least ten degrees, relative the radial plane.

The outlet conduit 23 is arranged at an axially upper position in the separation space 17, such that the outlet conduit inlet 23*a* is arranged for transporting separated heavy phase from the axially uppermost position 17*b* of the separation space 17. The outlet conduit 23 further extends radially out into the separation space 17 so that outlet conduit inlet 23*a* is arranged for transporting separated heavy phase from the periphery of the separation space 17, i.e. from the radially outermost position in the separation space 17 at the inner surface of the separation space 17.

The conduit outlet 23*b* of the stationary outlet conduit 23 ends at the heavy phase outlet 22, which is connected to a corresponding stationary outlet conduit 8 arranged in the second, upper stationary portion 4. Separated heavy phase is thus discharged via the top, i.e. at the upper axial end 6, of the separation insert 1.

Furthermore, separated liquid light phase, which has passed radially inwards in the separation space 17 through the stack of separation discs 19, is collected in the liquid light phase outlet 21 arranged at the axially lower end of the rotor casing 2. The liquid light phase outlet 21 is connected to a corresponding stationary outlet conduit 9 arranged in the first, lower stationary portion 3 of the insert 1. Thus, separated liquid light phase is discharged via the first, lower, axial end 5 of the exchangeable separation insert 1.

The stationary outlet conduit 9 arranged in the first stationary portion 3 and the stationary heavy phase outlet conduit 8 arranged in the second stationary portion 4 may comprise tubing, such as plastic tubing.

Figure 5:
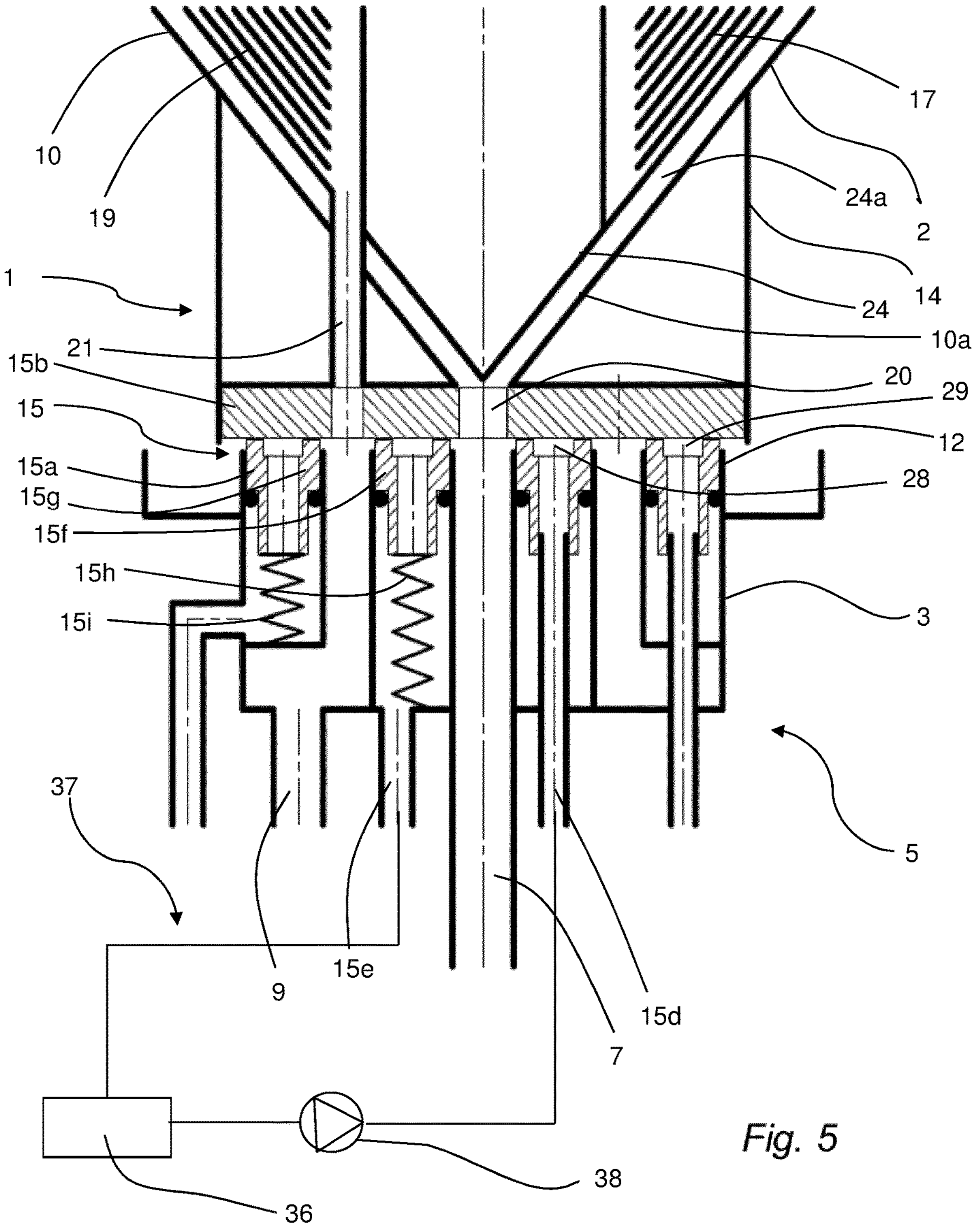
FIG. 5. is a schematic section view of a part of an exchangeable separation insert according to the present disclosure.

In FIG. 3 and also in FIG. 5 in further detail, a lower first rotatable seal 15, which separates the rotor casing 2 from the first stationary portion 3, is arranged within the lower seal housing 12, and an upper second rotatable seal 16, which separates the rotor casing 2 from the second stationary portion 4, is arranged within the upper seal housing 13. The first 15 and second 16 rotatable seals are hermetic seals, thus forming mechanically hermetically sealed inlet and outlets.

The lower rotatable seal 15 may be attached directly to the inlet cone 10*a* without any additional inlet pipe, i.e. the feed inlet 20 may be formed at the apex of the inlet cone 10*a* directly axially above the lower first rotatable seal 15. Such an arrangement enables a firm attachment of the lower first mechanical seal 15 at a large diameter to minimize axial run-out.

The lower first rotatable seal 15 seals and connects both the inlet 20 to the stationary inlet conduit 7 and seals and connects the liquid light phase outlet 21 to the stationary liquid light phase conduit 9. The lower first rotatable 15 seal thus forms a concentric double mechanical seal, which allows for easy assembly with few parts.

Figure 4:
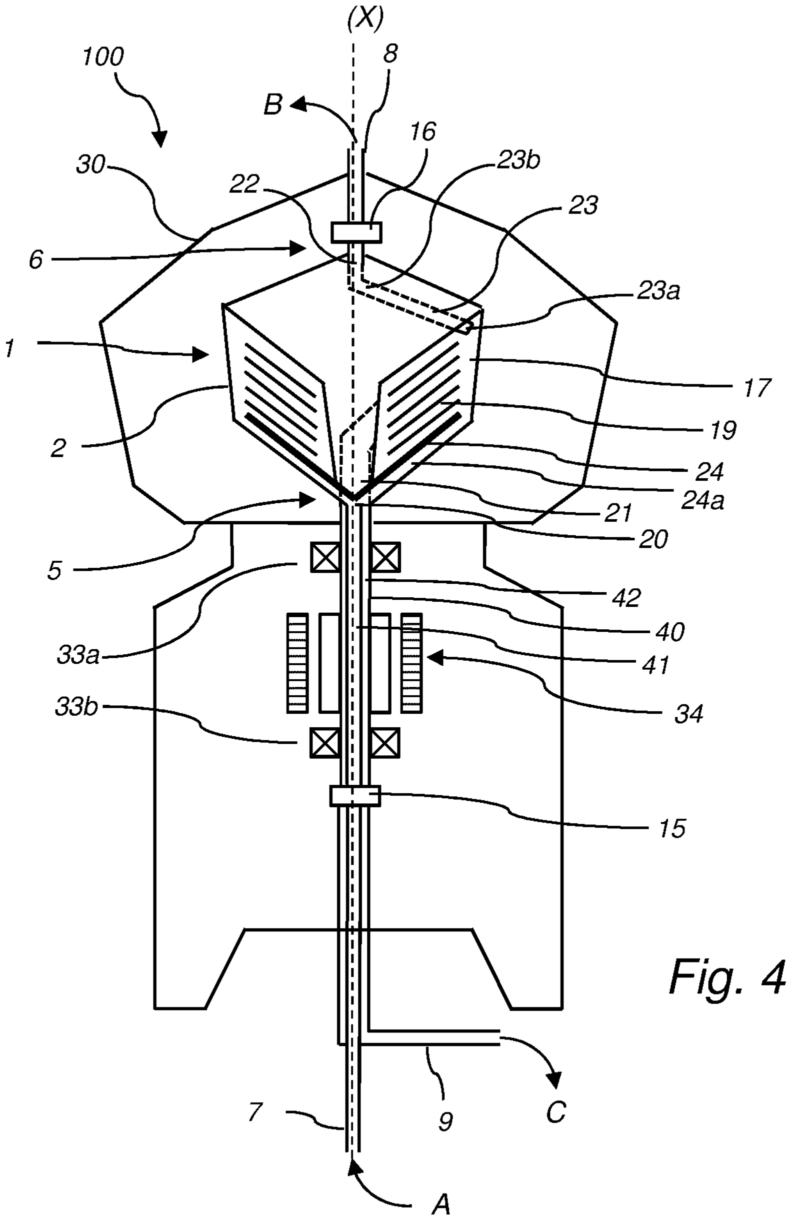
FIG. 4. is a schematic illustration of a centrifugal separator comprising a centrifugal separator bowl according to the present disclosure.

The lower first rotatable seal 15 comprises a stationary part 15*a* arranged in the first stationary portion 3 of the insert 1 and a rotatable part 15*b* arranged in the axially lower portion of the rotor casing 2. The rotatable part 15*b* comprises in the embodiment shown in FIG. 5 a rotatable sealing ring arranged in the rotor casing 2 and the stationary part 15*a* comprises two stationary concentrical sealing rings 15*f*, 15*g* arranged in the first stationary portion 3 of the insert 1. In FIG. 3 the stationary part 15*a* is one stationary sealing ring arranged in the first stationary portion 3. There are further means (not shown in FIG. 3), such as at least one spring arrangement, for bringing the rotatable sealing ring and the stationary sealing ring into engagement with each other, thereby forming at least one sealing interface 15*c* between the rings. In FIG. 5, each of the stationary concentrically sealing rings 15*f*, 15*g* has a spring arrangement 15*h*, 15*i*. The spring arrangement is comprised of at least one spring arranged circumferential on the upper side of each of the stationary sealing rings. In the embodiment disclosed in FIG. 5 the springs are helical springs arranged circumferential on the upper side of each of the stationary sealing rings. The formed lower sealing interface 15*c* extends substantially in parallel with the radial plane with respect to the axis of rotation (X). This lower sealing interface 15*c* thus forms the border or interface between the rotor casing 2 and the first stationary portion 3 of the insert 1. There are further connections 15*d*, 15*e* arranged in the first stationary portion 3 for supplying and removing a liquid, such as a cooling liquid, buffer liquid or barrier liquid, to and from the lower first rotatable seal 15. This liquid may be supplied to the interface 15*c* between the sealing rings. There may be only one such connection in the form of a seal fluid inlet 15*d* for supplying such a liquid. In FIG. 3 and FIG. 5 there is a seal fluid inlet 15*d* and a seal fluid outlet 15*e* for removing said liquid. There may in other embodiments be more than one connection for supplying liquid and/or more than one connection for removing said liquid. In the embodiment according to FIG. 5, there are disclosed a seal fluid inlet 15*d*, and a seal fluid outlet 15*e* for the inner sealing ring 15*f*, and also for the outer sealing ring 15*g*, which are not shown. The seal fluid inlet and the seal fluid outlet 15*d*, 15*e* are connected to at least one recess 28 in said inner sealing ring 15*f*, which recess 28 is open towards the rotatable part 15*b* of the rotatable seal 15. The recess 28 in the embodiment disclosed in FIG. 5 is ring-formed following the ring-form of the inner sealing ring 15*f*, but in other embodiments there may instead be several recesses arranged circumferentially. The outer sealing ring 15*g* is also provided with a recess 29 or recesses in the same manner. When thus liquid is supplied to the connections 15*d* for supplying liquid, the liquid fills the recesses 28, 29 and serves as cooling liquid, buffer liquid or barrier liquid. The connections 15*d*, 15*e* for supplying and removing said liquid may be connected to a liquid supply source and a liquid container 36, respectively. In the embodiment disclosed in FIG. 5, the connections 15*d*, 15*e* are connected to a liquid container 36, in this case a bag, in a closed circulation system 37, where the liquid is transported through the connections 15*d* for supplying liquid to the sealing rings 15*f*, 15*g* and back through the connections 15*e* for removing liquid to said liquid container 36. The circulation is, in the embodiment disclosed in FIG. 4, provided by a pump 38. There may be one closed circulation system for supplying both the inner and outer sealing rings 15*f*, 15*g* with liquid. Instead in other embodiments, each of the sealing rings 15*f*, 15*g* may have their own closed circulation system and thus pump. Instead of pumps, the pressure in the closed circulation systems may be provided by the liquid container being pre-pressurized. By circulating liquid to and from the sealing rings it is possible to control the leakage in the seal 15. In FIG. 5 is shown a scale 39 which weighs the liquid container 36 continuously or intermittently to determine whether the weight increases or decreases. From a change in weight it is possible to determine whether sealing liquid is leaking out of the seal or process liquid is leaking into the seal.

In analogy, FIG. 3 discloses an upper second rotatable seal 16 seals and connects the heavy phase outlet 22 to the stationary outlet conduit 8. The upper mechanical seal may also be a concentric double mechanical seal. The upper rotatable seal 16 comprises a stationary part 16*a* arranged in the second stationary portion 4 of the insert 1 and a rotatable part 16*b* arranged in the axially upper portion of the rotor casing 2. The rotatable part 16*b* is in this embodiment a rotatable sealing ring arranged in the rotor casing 2 and the stationary part 16*a* is a stationary sealing ring arranged in the second stationary portion 4 of the insert 1. There are further means (not shown), such as at least one spring, for bringing the rotatable sealing ring and the stationary sealing ring into engagement with each other, thereby forming at least one sealing interface 16*c* between the rings. The formed sealing interface 16*c* extends substantially in parallel with the radial plane with respect to the axis of rotation (X). This sealing interface 16*c* thus forms the border or interface between the rotor casing 2 and the second stationary portion 4 of the insert 1. There are further connections 16*d* and 16*e* arranged in the second stationary portion 4 for supplying and removing a liquid, such as a cooling liquid, buffer liquid or barrier liquid, to and from the upper rotatable seal 16. This liquid may be supplied to the interface 16*c* between the sealing rings in analogy with said lower first rotatable seal 15. The connections 16*d* and 16*e* may be connected to the closed circulation system 37, described in connection with said lower first rotatable seal 15, or may have a closed circulation system of its own.

Furthermore, FIG. 3 shows the exchangeable separation insert 1 in a transport mode. In order to secure the first stationary portion 3 to the rotor casing 2 during transport, there is a lower securing means 25 in the form of a snap fit that axially secures the lower first rotatable seal 15 to the cylindrical portion 14 of rotor casing 2. Upon mounting the exchangeable insert 1 in a rotating assembly, the snap fit 25 may be released such that the rotor casing 2 becomes rotatable around axis (X) at the lower first rotatable seal 15.

Moreover, during transport, there is an upper securing means 27*a, b* that secures the position of the second stationary portion 4 relative the rotor casing 2. The upper securing means is in the form of an engagement member 27*a* arranged on the rotor casing 2 that engages with an engagement member 27*b* on the second stationary portion 4, thereby securing the axial position of the second stationary portion 4. Further, there is a sleeve member 26 arranged in a transport or setup position in sealing abutment with the rotor casing 2 and the second stationary portion 4. The sleeve member 26 is further resilient and may be in the form of a rubber sleeve. The sleeve member 26 is removable from the transport or setup position for permitting the rotor casing 2 to rotate in relation to the second stationary portion 4. Thus, the sleeve member 26 seals radially against the rotor casing 2 and radially against the second stationary portion 4 in the setup or transport position. Upon mounting the exchangeable insert 1 in a rotating assembly, the sleeve member 26 may be removed and an axial space between engagement members 27*a* and 27*b* may be created in order to allow rotation of the rotor casing 2 relative the second stationary portion 4.

The lower and upper rotatable seals 15, 16 are mechanical seals, hermetically sealing the inlet and the two outlets. During operation, the exchangeable separation insert 1, inserted into a rotatable member 31, is brought into rotation around rotational axis (X). Liquid mixture to be separated is supplied via stationary inlet conduit 7 to the inlet 20 of the insert, and is then guided by the distributing channels 24*a* of the distributor 24 to the separation space 17. Thus, the liquid mixture to be separated is guided solely along an axially upwards path from the inlet conduit 7 to the separation space 17. Due to a density difference the liquid mixture is separated into a liquid light phase and a liquid heavy phase. This separation is facilitated by the interspaces between the separation discs of the stack 19 fitted in the separation space 17. The separated liquid heavy phase is collected from the periphery of the separation space 17 by outlet conduit 23 and is forced out via the heavy phase outlet 22 arranged at the rotational axis (X) to the stationary heavy phase outlet conduit 8. Separated liquid light phase is forced radially inwards through the stack 19 of separation discs and led via the liquid light phase outlet 21 out to the stationary light phase conduit 9.

Consequently, in this embodiment, the feed is supplied via the lower axial end 5, the separated light phase is discharged via the lower axial end 5, whereas the separated heavy phase is discharged via the upper axial end 6.

Further due to the arrangement of the feed inlet 20, distributor 24, stack 19 of separation discs and the outlet conduit 23 as disclosed above, the exchangeable separation insert 1 is de-aerated automatically, i.e. the presence of air-pockets is eliminated or decreased so that any air present within the rotor casing 2 is forced to travel unhindered upwards and out via the heavy phase outlet 22. Thus, at standstill, there are no air pockets, and if the insert 1 is filled up through the feed inlet 20 all air may be vented out through the heavy phase outlet 22. This also facilitates filling the separation insert 1 at standstill and start rotating the rotor casing 2 when liquid mixture to be separated or buffer fluid for the liquid mixture is present within the insert 1.

As also seen in FIG. 3, the exchangeable separation insert 1 has a compact design. As an example, the axial distance between the imaginary apex 18 of the lowermost separation disc in the stack 19 may be less than 10 cm, such as less than 5 cm, from the lower first stationary portion 3, i.e. less than 10 cm, such as less than 5 cm, from the sealing interface 15*c* of the lower first rotatable seal 15.

FIG. 4 shows an example of a centrifugal separator 100 comprising a centrifugal separator bowl 1 of the present disclosure. The centrifugal separator 100 may be for separating a cell culture mixture. The separator 100 comprises a frame 30, a hollow spindle 40, which is rotatably supported by the frame 30 in a bottom bearing 33*b* and a top bearing 33*a*, and a centrifugal separator bowl 1 having a rotor casing 2. The rotor casing 2 is adjoined to the axially upper end of the spindle 40 to rotate together with the spindle 40 around the axis (X) of rotation. The rotor casing 2 encloses a separation space 17 in which a stack 19 of separation discs is arranged in order to achieve effective separation of a liquid mixture that is processed. The separation discs of the stack 19 have a frustoconical shape with the imaginary apex pointing axially downwards and are examples of surface-enlarging inserts. The stack 19 is fitted centrally and coaxially with the rotor casing 2. In FIG. 4, only a few separation discs are shown. The stack 19 may for example contain above 100 separation discs, such as above 200 separation discs.

The rotor casing 2 has a mechanically hermetically sealed liquid outlet 21 for discharge of a separated liquid light phase, and a heavy phase outlet 22 for discharge of a phase of higher density than the separated liquid light phase. There is a single outlet conduit 23 in the form of a pipe for transporting separated heavy phase from the separation space 17. This conduit 23 extends from a radially outer position of the separation space 17 to the heavy phase outlet 22. The conduit 23 has a conduit inlet 23*a* arranged at the radially outer position and a conduit outlet 23*b* arranged at a radially inner position. Further the outlet conduit 23 is arranged with an upward tilt relative the radial plane from the conduit inlet 23*a* to the conduit outlet 23*b*.

There is also a mechanically hermetically sealed inlet 20 for supply of the liquid mixture to be processed to said separation space 17. The inlet 20 is in this embodiment connected to a central duct 41 extending through the spindle 40, which thus takes the form of a hollow, tubular member. Introducing the liquid material from the bottom provides a gentle acceleration of the liquid material. The spindle 40 is further connected to a stationary inlet pipe 7 at the bottom axial end of the centrifugal separator 100 via a hermetic seal 15, such that the liquid mixture to be separated may be transported to the central duct 41, e.g. by means of a pump. The separated liquid light phase is in this embodiment discharged via an outer annular duct 42 in said spindle 40. Consequently, the separated liquid phase of lower density is discharged via the bottom of the separator 100.

A first mechanical hermetic seal 15 is arranged at the bottom end to seal the hollow spindle 40 to the stationary inlet pipe 7. The hermetic seal 15 is an annular seal that surrounds the bottom end of the spindle 40 and the stationary pipe 7. The first hermetic seal 15 is a concentric double seal that seals both the inlet 21 to the stationary inlet pipe 7 and the liquid light phase outlet 21 to a stationary outlet pipe 9. There is also a second mechanical hermetic seal 16 that seals the heavy phase outlet 22 at the top of the separator 100 to a stationary outlet pipe 8.

As seen in FIG. 4, the inlet 20, and the heavy phase outlet 22 as well as the stationary outlet pipe 8 for discharging separated heavy phase are all arranged around rotational axis (X) so that liquid mixture to be separated enters said rotor casing 2 at the rotational axis (X), as indicated by arrow "A", and the separated heavy phase is discharged at the rotational axis (X), as indicated by arrow "B". The discharged liquid light phase is discharged at the bottom end of the centrifugal separator 100, as illustrated by arrow "C".

The centrifugal separator 100 is further provided with a drive motor 34. This motor 34 may for example comprise a stationary element and a rotatable element, which rotatable element surrounds and is connected to the spindle 40 such that it transmits driving torque to the spindle 40 and hence to the rotor casing 2 during operation. The drive motor 34 may be an electric motor. Furthermore, the drive motor 34 may be connected to the spindle 40 by transmission means. The transmission means may be in the form of a worm gear which comprises a pinion and an element connected to the spindle 40 in order to receive driving torque. The transmission means may alternatively take the form of a propeller shaft, drive belts or the like, and the drive motor 34 may alternatively be connected directly to the spindle 40.

During operation of the separator in FIG. 4, the centrifugal separator bowl 1 and rotor casing 2 are caused to rotate by torque transmitted from the drive motor 34 to the spindle 40. Via the central duct 41 of the spindle 40, liquid mixture to be separated is brought into the separation space 17 via inlet 20. The inlet 20 and the stack 19 of separation discs are arranged so that the liquid mixture enters the separation space 19 at a radial position that is at, to or radially outside, the outer radius of the stack 19 of separation discs.

In the hermetic type of inlet 20, the acceleration of the liquid material is initiated at a small radius and is gradually increased while the liquid leaves the inlet 20 and enters the separation space 17. The separation space 17 is intended to be completely filled with liquid during operation. In principle, this means that preferably no air or free liquid surfaces is meant to be present within the rotor casing 2. However, liquid mixture may be introduced when the rotor is already running at its operational speed or at standstill. Liquid mixture may thus be continuously introduced into the rotor casing 2.

Due to a density difference, the liquid mixture is separated into a liquid light phase and a heavy phase. This separation is facilitated by the interspaces between the separation discs of the stack 19 fitted in the separation space 17. The separated heavy phase is collected from the periphery of the separation space 17 by conduit 23 and forced out through outlet 22 arranged at the rotational axis (X), whereas separated liquid light phase is forced radially inwards through the stack 19 and then led out through the annular outer duct 42 in the spindle 40.

In FIG. 3 and also in FIG. 5 in further detail, a lower first rotatable seal 15, which separates the rotor casing 2 from the first stationary portion 3, is arranged within the lower seal housing 12, and an upper second rotatable seal 16, which separates the rotor casing 2 from the second stationary portion 4, is arranged within the upper seal housing 13. The first 15 and second 16 rotatable seals are hermetic seals, thus forming mechanically hermetically sealed inlet and outlets. The lower rotatable seal 15 may be attached directly to the inlet cone 10*a* without any additional inlet pipe, i.e. the feed inlet 20 may be formed at the apex of the inlet cone 10*a* directly axially above the lower first rotatable seal 15. Such an arrangement enables a firm attachment of the lower first mechanical seal 15 at a large diameter to minimize axial run-out.

The lower first rotatable seal 15 seals and connects both the inlet 20 to the stationary inlet conduit 7 and seals and connects the liquid light phase outlet 21 to the stationary liquid light phase conduit 9. The lower first rotatable 15 seal thus forms a concentric double mechanical seal, which allows for easy assembly with few parts. The lower first rotatable seal 15 comprises a stationary part 15*a* arranged in the first stationary portion 3 of the insert 1 and a rotatable part 15*b* arranged in the axially lower portion of the rotor casing 2. The rotatable part 15*b* comprises in the embodiment shown in FIG. 5 a rotatable sealing ring arranged in the rotor casing 2 and the stationary part 15*a* comprises two stationary concentrical sealing rings 15*f*, 15*g* arranged in the first stationary portion 3 of the insert 1, wherein the light phase conduit 9 is arranged between said two concentrical sealing rings 15*f*, 15*g* and the inlet conduit 7 is arranged in the inner ring 15*f* at the axis of rotation X. In FIG. 3 the stationary part 15*a* is one stationary sealing ring arranged in the first stationary portion 3. There are further means (not shown in FIG. 3), such as at least one spring arrangement, for bringing the rotatable sealing ring and the stationary sealing ring into engagement with each other, thereby forming at least one sealing interface 15*c* between the rings. In FIG. 5, each of the stationary concentrically sealing rings 15*f*, 15*g* has a spring arrangement 15*h*, 15*i*. The spring arrangement is comprised of at least one spring arranged circumferential on the upper side of each of the stationary sealing rings. In the embodiment disclosed in FIG. 5 the springs are helical springs arranged circumferential on the upper side of each of the stationary sealing rings. The formed lower sealing interface 15*c* extends substantially in parallel with the radial plane with respect to the axis of rotation (X). This lower sealing interface 15*c* thus forms the border or interface between the rotor casing 2 and the first stationary portion 3 of the insert 1. There are further connections 15*d*, 15*e* arranged in the first stationary portion 3 for supplying and removing a liquid, such as a cooling liquid, buffer liquid or barrier liquid, to and from the lower first rotatable seal 15. This liquid may be supplied to the interface 15*c* between the sealing rings. There may be only one such connection in the form of a seal fluid inlet 15*d* for supplying such a liquid. In FIG. 3 and FIG. 5 there is a seal fluid inlet 15*d* and a seal fluid outlet 15*e* for removing said liquid. There may in other embodiments be more than one connection for supplying liquid and/or more than one connection for removing said liquid. In the embodiment according to FIG. 5, there are disclosed a seal fluid inlet 15*d*, and a seal fluid outlet 15*e* for the inner sealing ring 15*f*, and also for the outer sealing ring 15*g*, which are not shown. The seal fluid inlet and the seal fluid outlet 15*d*, 15*e* are connected to at least one recess 28 in said inner sealing ring 15*f*, which recess 28 is open towards the rotatable part 15*b* of the rotatable seal 15. The recess 28 in the embodiment disclosed in FIG. 5 is ring-formed following the ring-form of the inner sealing ring 15*f*, but in other embodiments there may instead be several recesses arranged circumferentially. The outer sealing ring 15*g* is also provided with a recess 29 or recesses in the same manner. When thus liquid is supplied to the connections 15_d_ for supplying liquid, the liquid fills the recesses 28, 29 and serves as cooling liquid, buffer liquid or barrier liquid. The connections 15_d_, 15_e_ for supplying and removing said liquid may be connected to a liquid supply source and a liquid container 36, respectively. In the embodiment disclosed in FIG. 5, the connections 15_d_, 15_e_ are connected to a liquid container 36, in this case a bag, in a closed circulation system 37, where the liquid is transported through the connections 15_d_ for supplying liquid to the sealing rings 15_f_, 15_g_ and back through the connections 15_e_ for removing liquid to said liquid container 36. The circulation is, in the embodiment disclosed in FIG. 4, provided by a pump 38. There may be one closed circulation system for supplying both the inner and outer sealing rings 15_f_, 15_g_ with liquid. Instead in other embodiments, each of the sealing rings 15_f_, 15_g_ may have their own closed circulation system and thus pump. Instead of pumps, the pressure in the closed circulation systems may be provided by the liquid container being pre-pressurized. By circulating liquid to and from the sealing rings it is possible to control the leakage in the seal 15. In FIG. 5 is shown a scale 39 which weighs the liquid container 36 continuously or intermittently to determine whether the weight increases or decreases. From a change in weight it is possible to determine whether sealing liquid is leaking out of the seal or process liquid is leaking into the seal.

In analogy, FIG. 3 discloses an upper second rotatable seal 16 seals and connects the heavy phase outlet 22 to the stationary outlet conduit 8. The upper mechanical seal may also be a concentric double mechanical seal. The upper rotatable seal 16 comprises a stationary part 16_a_ arranged in the second stationary portion 4 of the insert 1 and a rotatable part 16_b_ arranged in the axially upper portion of the rotor casing 2. The rotatable part 16_b_ is in this embodiment a rotatable sealing ring arranged in the rotor casing 2 and the stationary part 16_a_ is a stationary sealing ring arranged in the second stationary portion 4 of the insert 1. There are further means (not shown), such as at least one spring, for bringing the rotatable sealing ring and the stationary sealing ring into engagement with each other, thereby forming at least one sealing interface 16_c_ between the rings. The formed sealing interface 16_c_ extends substantially in parallel with the radial plane with respect to the axis of rotation (X). This sealing interface 16_c_ thus forms the border or interface between the rotor casing 2 and the second stationary portion 4 of the insert 1. There are further connections 16_d_ and 16_e_ arranged in the second stationary portion 4 for supplying and removing a liquid, such as a cooling liquid, buffer liquid or barrier liquid, to and from the upper rotatable seal 16. This liquid may be supplied to the interface 16_c_ between the sealing rings in analogy with said lower first rotatable seal 15. The connections 16_d_ and 16_e_ may be connected to the closed circulation system 37, described in connection with said lower first rotatable seal 15, or may have a closed circulation system of its own.

In another embodiment, not shown, instead of arranging the feed inlet and the light phase outlet in a first axial end, the feed inlet and the heavy phase outlet are arranged in this end of the rotor casing. The heavy phase outlet conduit is arranged between said two concentrical sealing rings and the inlet conduit is arranged in the inner ring at the axis of rotation X.

The first seal assembly is then sealing and connecting said feed inlet to a stationary inlet conduit and said heavy phase outlet to a stationary heavy phase outlet conduit, in said first stationary portion.

The feed inlet is thus arranged axially at the axis of rotation and the heavy phase outlet is arranged axially outside of said feed inlet in such a manner that both the feed inlet and the heavy phase outlet are led through the rotatable part and connected to said stationary feed inlet conduit and said stationary heavy phase outlet conduit, respectively, which are led through said stationary part of said first seal assembly.

In yet another embodiment, not shown, instead of arranging the feed inlet and the light phase outlet in a first axial end, the light phase outlet and the heavy phase outlet are arranged in this end of the rotor casing. The light phase outlet conduit is arranged between said two concentrical sealing rings and the heavy phase conduit is arranged in the inner ring at the axis of rotation X.

The first seal assembly 15 is then sealing and connecting said light phase outlet to the stationary light phase conduit and said heavy phase outlet to the stationary heavy phase outlet conduit, in said first stationary portion.

The heavy phase outlet is thus arranged axially at the axis of rotation and the light phase outlet is arranged axially outside of said heavy phase outlet in such a manner that both the light phase outlet and the heavy phase outlet are led through the rotatable part 15_a_ and connected to said stationary light phase outlet conduit and said stationary heavy phase outlet conduit, respectively, which are led through said stationary part 15_b_ of said first seal assembly 15.

In these embodiments not shown are the sealings formed in the same manner as in the embodiment described in connections with the FIGS. as are the circuits of the cooling liquid, buffer liquid or barrier liquid. To a person skilled in the art it is obvious how the interior of the bowl is to be adapted to these embodiments e.g. the position of the disc stack and distributor may be turned so their apex always is pointing towards the inlet.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An exchangeable separation insert for a centrifugal separator, for separating a fluid mixture, comprising:

a rotor casing enclosing a separation space in which a stack of separation discs is arranged to rotate around an axis of rotation, said rotor casing being axially arranged between a first stationary portion and a second stationary portion;

a feed inlet for supply of the fluid mixture to be separated to said separation space, a light phase outlet for discharge of a separated phase of a first density, and a heavy phase outlet for discharge of a separated phase of a second density higher than said first density, wherein two of said feed inlet, light phase outlet and heavy phase outlet are arranged at a first axial end of said rotor casing; and a first seal assembly sealing and connecting said two of said feed inlet, light phase outlet and heavy phase outlet to a corresponding inlet conduit and/or outlet conduits in said first stationary portion, wherein said first seal assembly comprises a rotatable part attached to said rotor casing and a stationary part attached to said first stationary portion, wherein said rotatable part and said stationary part are axially aligned and seal against each other, and wherein a first of said two of said feed inlet, light phase outlet and heavy phase outlet is arranged axially at the axis of rotation and a second of said two of said feed inlet, light phase outlet and heavy phase outlet has an axis axially outside of said first of said two of said feed inlet, light phase outlet and heavy phase outlet in such a manner that both said first and second of said two of said feed inlet, light phase outlet and heavy phase outlet are led through said rotatable part and said corresponding inlet conduit and/or outlet conduits are led through said stationary part of said first seal assembly.

2. The exchangeable separation insert for a centrifugal separator according to claim 1, wherein said light phase outlet is arranged at said first axial end.

3. The exchangeable separation insert for a centrifugal separator according to claim 1, wherein said feed inlet is arranged at said first axial end.

4. The exchangeable separation insert for a separation separator according to claim 1, wherein said heavy phase outlet is arranged at said first axial end.

5. The exchangeable separation insert for a centrifugal separator according to claim 1, wherein said rotatable part is a plate-formed seal element with a centre-hole for said feed inlet and at least one outlet-hole for one of the light phase or heavy phase outlets.

6. The exchangeable separation insert for a centrifugal separator according to claim 1, wherein said stationary part comprises two concentrically arranged ring-formed seal elements.

7. The exchangeable separation insert for a centrifugal separator according to claim 5, wherein said stationary part comprises two concentrically arranged ring-formed seal elements, and wherein the inner of said ring-formed seal elements is arranged to engage with the rotatable part axially outside said centre-hole and axially inside said at least one outlet-hole.

8. The exchangeable separation insert for a centrifugal separator according to claim 6, wherein at least one fluid connection is formed within at least the inner of said two ring-formed seal elements.

9. The exchangeable separation insert for a centrifugal separator according to claim 8, wherein at least the inner of said two ring-formed seal elements has a recess in a surface thereof facing said rotatable part of said seal assembly, the recess being connected to said at least one fluid connection.

10. The exchangeable separation insert for a centrifugal separator according to claim 9, wherein the at least one fluid connection comprises a seal fluid inlet for supplying fluid to the at least one of said recesses.

11. The exchangeable separation insert for a centrifugal separator according to claim 10, wherein the at least one fluid connection also comprises a seal fluid outlet for removing fluid from the at least one of said recesses.

12. The exchangeable separation insert for a centrifugal separator according to claim 11, wherein said seal fluid inlet and said seal fluid outlet both are attached to a container forming a closed circulation system.

13. The exchangeable separation insert for a centrifugal separator according to claim 12, wherein a pump is arranged in said seal fluid inlet to supply liquid to said first seal assembly.

14. A centrifugal separator comprising a stationary frame and a rotatable member journaled in said stationary frame, comprising an exchangeable separation insert according to claim 1, the exchangeable separation insert being arranged in such manner that said rotor casing is fitted in said rotatable member, and said first and second stationary portions are fitted in said stationary frame.

15. The exchangeable separation insert for a centrifugal separator according to claim 1, wherein said centrifugal separator comprises a stationary frame and a rotatable member journaled in said stationary frame and wherein the exchangeable separation insert is configured to be inserted and secured within said rotatable member.

16. The exchangeable separation insert for a centrifugal separator according to claim 2, wherein said feed inlet is arranged at said first axial end.

17. The exchangeable separation insert for a separation separator according to claim 2, wherein said heavy phase outlet is arranged at said first axial end.

18. The exchangeable separation insert for a centrifugal separator according to claim 2, wherein said rotatable part is a plate-formed seal element with a centre-hole for said feed inlet and at least one outlet-hole for one of the light phase or heavy phase outlets.

19. The exchangeable separation insert for a centrifugal separator according to claim 3, wherein said rotatable part is a plate-formed seal element with a centre-hole for said feed inlet and at least one outlet-hole for one of the light phase or heavy phase outlets.

* * * * *